United States Patent [19]

Brian

[11] 3,940,033

[45] Feb. 24, 1976

[54] COFFEE MEASURE

[76] Inventor: Norton T. Brian, 1129 Harrop St., Ogden, Utah 84404

[22] Filed: Nov. 1, 1974

[21] Appl. No.: 520,035

[52] U.S. Cl. ............................................. 222/452
[51] Int. Cl.² ........................................ G01F 11/28
[58] Field of Search .......... 222/452, 363, 325, 368, 222/189

[56] References Cited
UNITED STATES PATENTS

| | | | |
|---|---|---|---|
| 584,253 | 6/1897 | Akeson | 222/363 |
| 2,059,135 | 10/1936 | Moe | 222/452 X |
| 2,104,332 | 1/1938 | Rhode et al. | 222/363 |
| 2,373,124 | 4/1945 | Le Frank | 222/452 X |
| 2,613,018 | 10/1952 | Truitt | 222/452 |
| 2,941,701 | 6/1960 | Stiewing et al. | 222/452 |
| 3,199,734 | 8/1965 | Hvistendahl | 222/452 X |

Primary Examiner—Allen N. Knowles
Assistant Examiner—Hadd Lane

[57] ABSTRACT

A dispenser for granular material having a mounting flange, a depending body with inlet, measuring cavity and outlet, a circular slot surrounding the cavity and a rotatable cylindrical member fitting into the slot, the member having a side opening which closes inlet or an outlet in its two positions to dispense the volume of the cavity. A pin limits the rotation and holds the parts in assembled condition.

3 Claims, 4 Drawing Figures

COFFEE MEASURE

The dispenser of this invention mounts on a bottle of Coffee Crystals, using an ordinary Mason fruit jar ring to hold it in place. The Measure is primarily intended for use with Instant Coffee, and powdered Creamers, but may also be used on several other granular beverages, such as Postum, Tang, Malted Milk, etc.

The unit consists of 3 parts, shown in FIG. 1, of the accompanying drawing. The main housing, 1, FIG. 1, The metering drum, 2, FIG. 1, and the stop pin, 3, FIG. 1.

Figure 1:
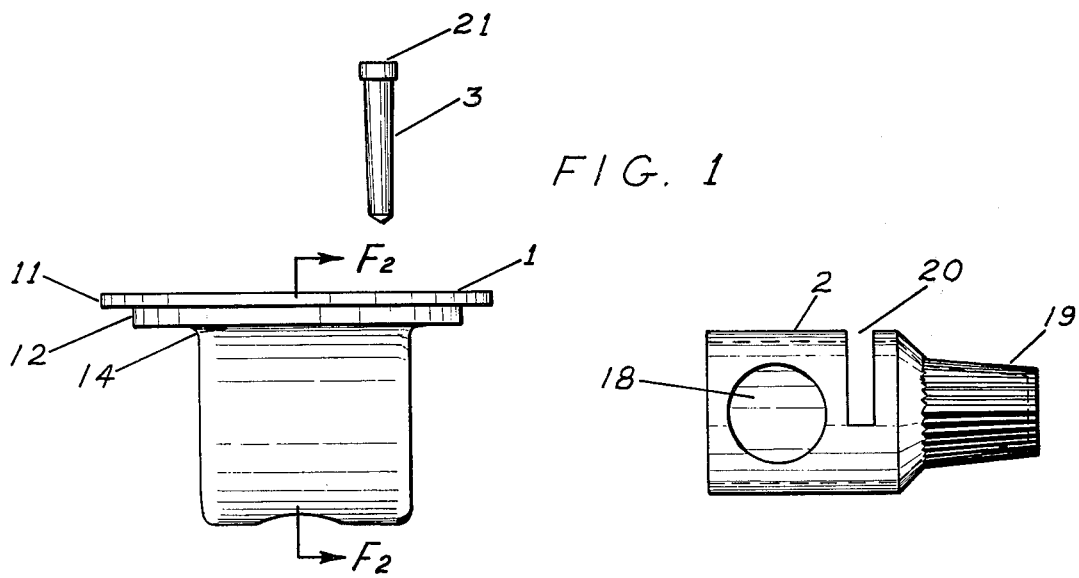
FIG. 1 is a dis-assembled side view.
Figure 3:
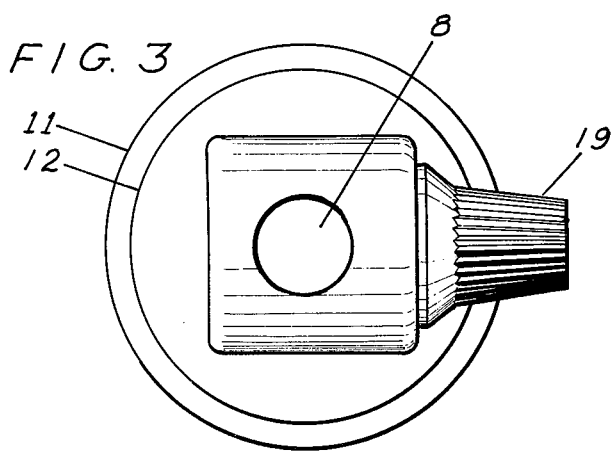
FIG. 3 is a top view of the assembled unit, with no hidden lines shown.

The main housing has a flange, 11, FIG. 1, and FIG. 3, with a major diameter, smaller than the root diameter of the threads in a standard Mason fruit jar ring. Said flange also has a minor diameter, smaller than the open end of said fruit jar ring. Ref. 12, FIG. 1, and FIG. 3.

Figure 2:
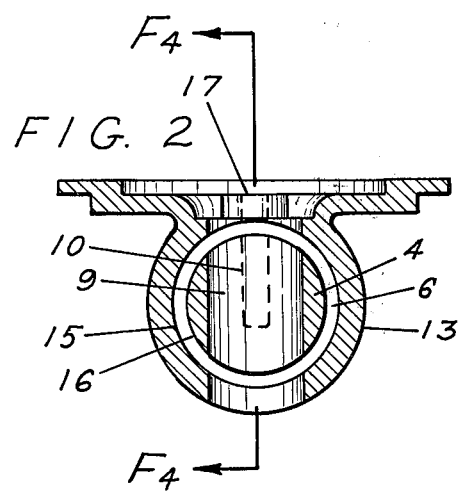
FIG. 2 is a cross section end view of the main housing.

Tangent to said flange, the main housing is cylindrical in shape, Ref. 13, FIG. 2, with its axis running parallel with the flange, and blending into it with a small fillet radius, Ref. 14, FIG. 1.

Figure 4:
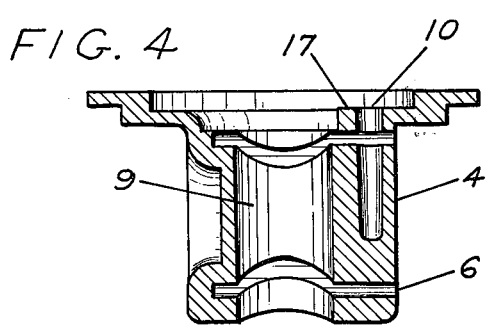
FIG. 4, is a cross section side view of the main housing.

The cylindrical section of the main housing is "trepanned", concentric with its axis, and extending approximately 90% of its length, (as if it were cut with a hole—saw), Ref. 6, FIG. 2, and FIG. 4, leaving a "core" attached to the back end of the cylindrical section of the main housing, Ref. 4, FIG. 2, and FIG. 4. The metering drum, 2, FIG. 1, slips into this cavity, with sufficient clearance all around for easy rotation with the thumb and fingers.

Perpendicular to the axis of the cylindrical section, and concentric with the diameter of the flange, a hole passes clear through the main housing. Ref. 8, FIG. 3. That portion of said hole, which passes through the core, shall be referred to as the "cavity", which has a fixed volume, and is stationary. Ref 9, FIG. 2, and FIG. 4.

Near the free end of the core, and parallel with the cavity, is a small tapered hole, which passes through a small boss, cast into the flange section, Ref. 17, FIG. 2, and extends part way into the core. Ref. 10, FIG. 2, and FIG. 4.

The metering drum, 2, FIG. 1, is cylindrical (or tubular) in shape, having an outside diameter and an inside diameter, its outside diameter being slightly smaller than the inside diameter of the main housing. Ref. 15, FIG. 2. The inside diameter of the drum is slightly larger than the outside diameter of the core of the main housing. Ref. 16, FIG. 2. One end of the drum is tapered down and extended, to form a splined dialing knob, for easy rotation with the thumb and fingers. Ref. 19, FIG. 1, and 3.

A hole passes through one side of the drum, Ref. 18, FIG. 1, and aligns with the hole in the core when the unit is assembled, and is the same diameter as the hole which passes through the main housing, and core. Ref. 8, FIG. 3.

The drum has a slot running through one side, between the hole and the dialing knob, Ref. 20, FIG. 1, and is perpendicular to its axis, and extending beyond the center line a distance equal to the radius of the stop pin, 3, FIG. 1. The slot is slightly wider than the diameter of the stop pin, and aligns with the tapered hole 10, FIG. 2 and FIG. 4 in the main housing when the unit is assembled. The plane, formed by the sides of the slot, is parallel with the axis of the hole in the metering drum. Ref. 18, FIG. 1.

The stop pin, 3, FIG. 1, is slightly tapered, and has an enlarged "head" on the large end for easy removal, 21, FIG. 1, and is the same diameter as the tapered hole in the main housing.

Said stop pin has a dual function: 1. It holds the metering drum in the main housing when the unit is assembled. 2. It acts as a stop, to limit rotation of the metering drum to 180°, clockwise, and counterclockwise, (and vice versa, as the metering drums are made in both right and left hand).

To operate the coffee measure, the bottle, holding the material to be metered out, is held over the cup or vessel in an inverted position, with the hole in the metering drum facing up, allowing the granular material to fall into the cavity, trapped in this position by the solid wall on the opposite side of the metering drum. When the drum is rotated 180°, with the thumb and fingers, the wall of the drum seals off the contents of the bottle, and the hole in the side of the drum aligns with the hole in the bottom end of the main housing, allowing the material to fall into the cup or vessel.

I am aware that prior to my invention, metering devises for granular materials such as gun powder, chilled shot, Bromo-seltzer, Malted Milk etc., have been designed, and all function in a similar manner. Most are designed to be mounted in a fixed position, whereby the vessel to be filled is held under the device while the material is being metered into said vessel.

I claim:

1. A dispensing device for powdered or granular material with a unitary structure wherein there is a mounting flange, a depending body having an inlet, outlet and fixed measuring cavity therein, a cylindrical slot opening from one side and extending beyond the cavity, but not to the rear, so as to leave a core containing said cavity, and a cylindrical member fitted into said slot, having an opening therein which may be aligned with said inlet, outlet and cavity, being held into the main body by means of a pin, said pin acting also as a stop to limit rotation of said cylindrical member, allowing said opening in said member to align with inlet, outlet and cavity in main body, and means to rotate said member between inlet and outlet.

2. A structure of claim 1 wherein said cylincrical member is tapered down on one end and extended to form a splined dialing knob for easy rotation with thumb and fingers, and has a slot therein perpendicular to its axis, which stradles said pin.

3. A structure of claim 1 wherein said pin is tapered.

* * * * *